(12) United States Patent
Andre et al.

(10) Patent No.: US 9,923,394 B2
(45) Date of Patent: Mar. 20, 2018

(54) PORTABLE ELECTRICAL POWER SUPPLY DEVICE

(71) Applicant: INGENICO GROUP, Paris (FR)

(72) Inventors: Jerome Andre, Montoison (FR);
Fabien Demange, Saint-Peray (FR);
Olivier Berthiaud, Cornas (FR)

(73) Assignee: INGENICO GROUP, Paris (FR)

( * ) Notice: Subject to any disclaimer, the term of this patent is extended or adjusted under 35 U.S.C. 154(b) by 121 days.

(21) Appl. No.: 14/931,412

(22) Filed: Nov. 3, 2015

(65) Prior Publication Data
US 2016/0126769 A1    May 5, 2016

(30) Foreign Application Priority Data

Nov. 3, 2014 (FR) ..................... 14 60590

(51) Int. Cl.
*H02J 7/00* (2006.01)
*H01M 2/06* (2006.01)
*H01M 2/30* (2006.01)

(52) U.S. Cl.
CPC ............ *H02J 7/0045* (2013.01); *H01M 2/06* (2013.01); *H01M 2/30* (2013.01)

(58) Field of Classification Search
USPC ........................................ 320/101, 107, 108
See application file for complete search history.

(56) References Cited

U.S. PATENT DOCUMENTS

| 5,739,666 | A | 4/1998 | Nierescher et al. |
| 6,634,896 | B1 * | 10/2003 | Potega ............... G01K 1/02 374/E1.002 |
| 2014/0199871 | A1 * | 7/2014 | Liu ............... H01R 31/065 439/312 |
| 2016/0013675 | A1 * | 1/2016 | Workman ............ H02J 7/0045 320/101 |

FOREIGN PATENT DOCUMENTS

CH     707313 A2    6/2014

OTHER PUBLICATIONS

English translation of the French Written Opinion dated Jun. 24, 2015 for French Application No. 1460590, filed Nov. 3, 2014.
French Search Report and Written Opinion dated Jun. 24, 2015 for French Application No. 1460590, filed Nov. 3, 2014.

* cited by examiner

*Primary Examiner* — Brian Ngo
(74) *Attorney, Agent, or Firm* — David D. Brush; Westman, Champlin & Koehler, P.A.

(57) ABSTRACT

A portable electrical power supply device includes a battery, cables and a female connector to which is attached a cover aimed at attaching the connector to the battery. This cover notably attaches the female connector and the battery as such. This gives a compact, consistent and rigid assembly. No separate handling operations need to be planned to insert the female connector into the male connector and insert the battery into its housing. Besides, in at least certain embodiments, the rigid cover is shaped so that it does not take up a volume greater than that of the battery without a cover.

8 Claims, 8 Drawing Sheets

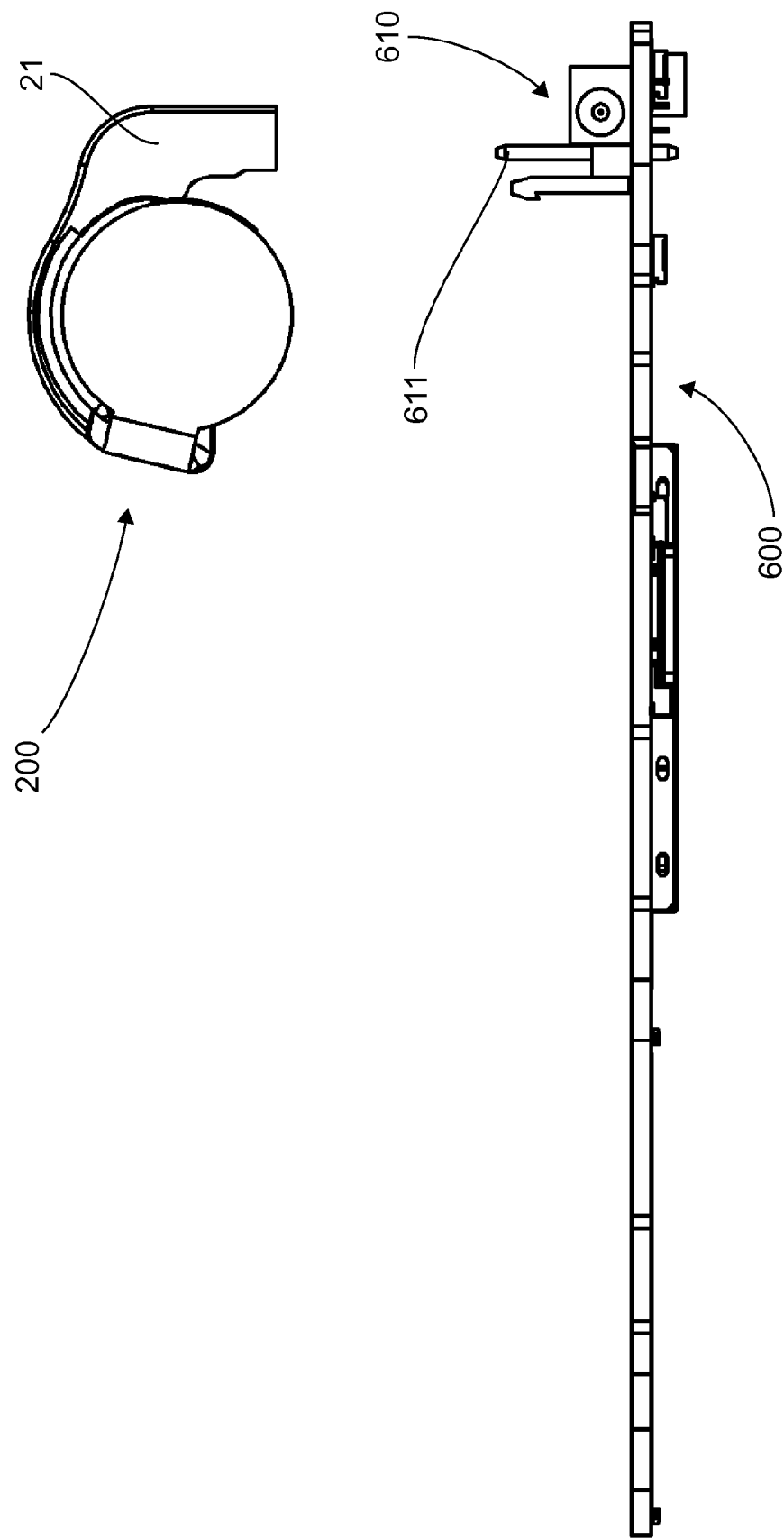

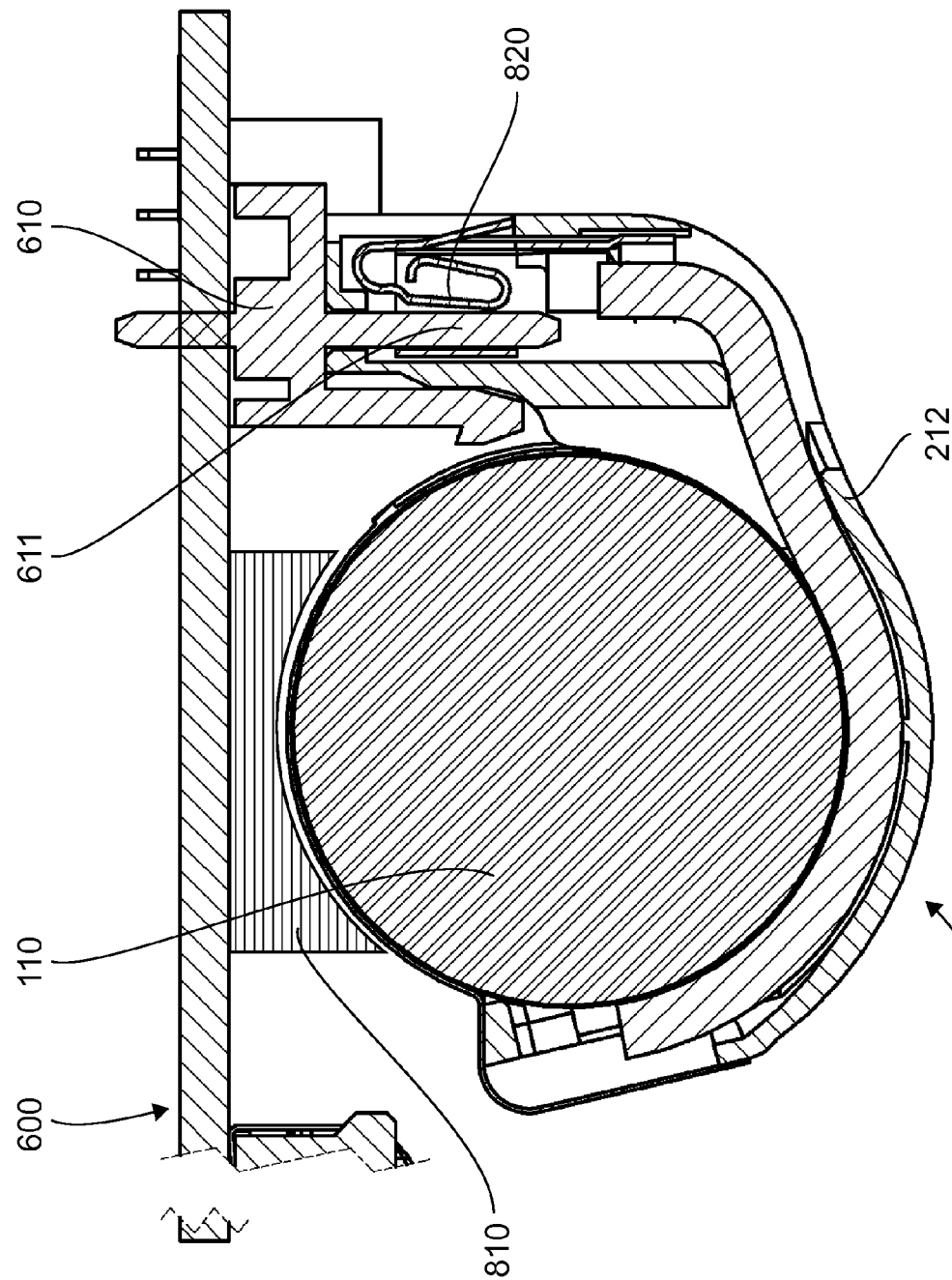

PORTABLE ELECTRICAL POWER SUPPLY DEVICE

1. FIELD OF THE DISCLOSURE

Figure 1:
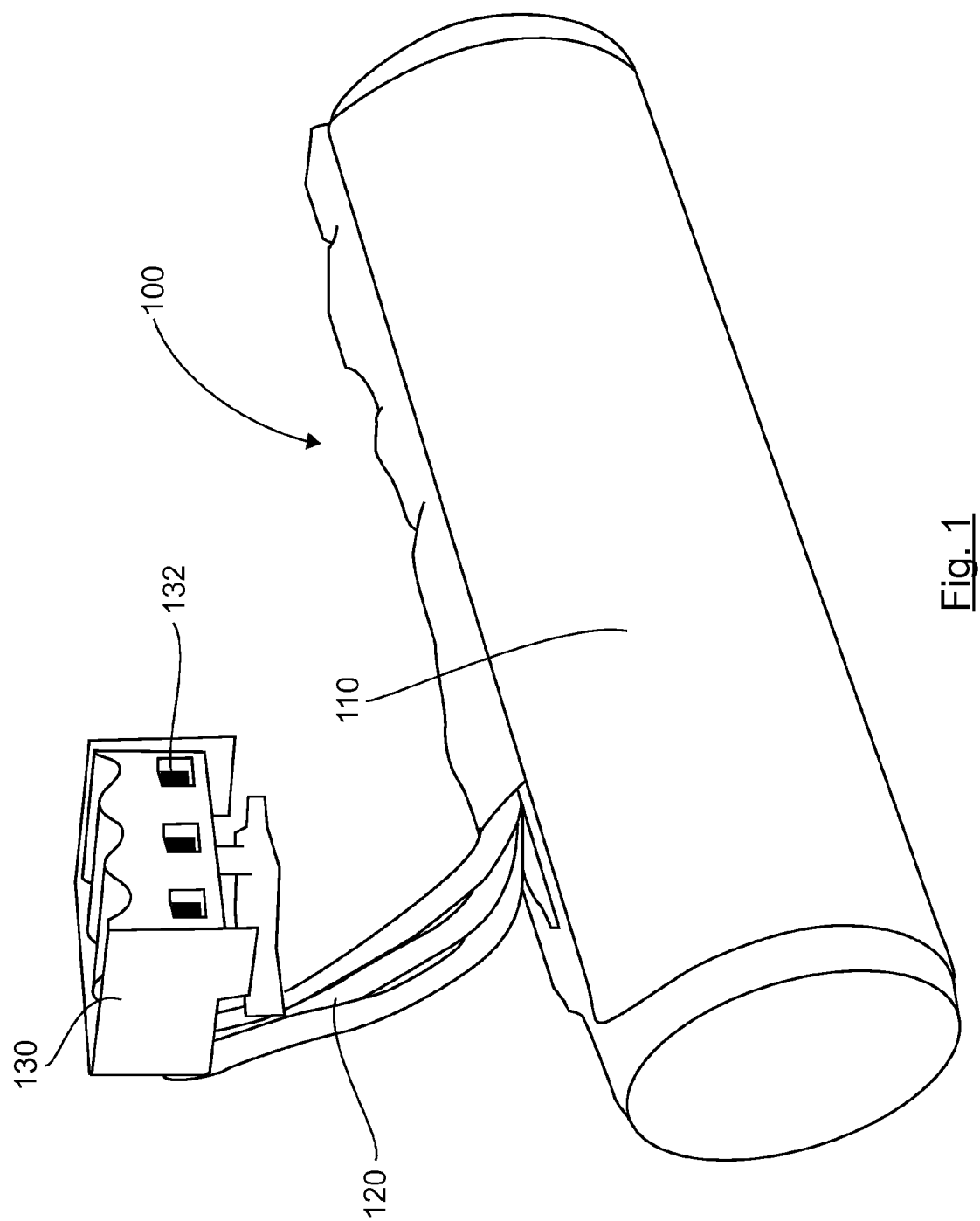

The field of the disclosure is that of autonomous electrical power supplies for electronic apparatuses. More specifically, the disclosure pertains to a portable electrical supply device and to a method for inserting it into and withdrawing it from an electronic apparatus such as a payment terminal.

2. PRIOR ART

Certain prior-art electronic apparatuses, and notably payment terminals, comprise a portable electrical power supply device comprising a battery connected to cables which are themselves connected to electrical contacts situated in the holes of a connector called a female connector.

This female connector of the portable electrical power supply device must be plugged into a male power supply connector connected to the motherboard of the electronic apparatus so that the battery can provide the energy needed for the operation of the electronic device.

However, the plugging in (insertion) of the female connector of existing battery sets into the male power connector has certain drawbacks.

On the one hand, the handling of the female connector and its insertion into the male power supply connector is done in small spaces within the electronic device, and this calls for a certain degree of dexterity and, possibly, small fingers.

On the other hand, the portable electrical power supply device has to be properly shaped so as to enable the insertion of the battery into a dedicated reception housing, often of restricted size, as well as the insertion of the male and female power supply connectors. In particular, the cables have to be accurately positioned before the battery is inserted into its reception housing.

Finally, the portable electrical power supply device generally requires the use of both of the user's hands, one hand serving to hold the battery and insert it into its reception housing and the other hand serving to position the cables and plug the female connector into the male power supply connector of the electronic apparatus.

The prior-art solutions can therefore raise problems inasmuch as the electronic apparatuses, and notably the payment terminals, are fragile devices for which a wrong insertion or connection of the portable electrical power supply device can cause damage to the male power supply connector that is connected to the motherboard.

The damage caused by the mishandling of the portable electrical power supply device is thus potentially hazardous to the operation of the electronic apparatus as well as to the user's health.

Besides, an electronic apparatus such as a payment terminal can include fail-safe devices which cause the electronic device to default when there is a wrong insertion or connection of the portable electrical power supply device into the power supply connector of the apparatus.

There is therefore a need for a portable electrical power supply device for electronic apparatuses and notably for electronic payment terminals that do not have the above-mentioned drawbacks of the prior art.

3. SUMMARY

An aspect of the present disclosure relates to a portable electrical power supply device comprising a battery connected to at least two cables, themselves connected to at least two electrical contacts situated in a connector, called a female connector.

According to the proposed technique, such a portable electrical power supply device furthermore comprises a hood or cover attached to the battery and rigidly binding the female connector to the battery.

Thus, the proposed technique relies on a novel and inventive approach to the design of a portable electrical power supply device.

Indeed, unlike in the prior-art techniques, the battery and the connector of such a portable electrical power supply device are attached to each other so that it is henceforth possible to handle the portable electrical power supply device as a single non-deformable unit. Thus, there is a correspondence between the position and orientation of the battery and those of the female connector in one particular embodiment.

According to one particular characteristic, such a cover comprises a first part having a shape that is substantially complementary to the shape of the battery and a second part having a shape that is substantially complementary to the shape of the female connector.

The use of shapes complementary to the elements constituting the portable electrical power supply device minimizes the volume of the cover and therefore of the portable electrical power supply device, in one particular embodiment.

This also allows to ensure the backward compatibility of the portable electrical power supply device with existing electronic apparatuses, and notably payment terminals, in one particular embodiment. Indeed, the complementary nature of the shapes prevents interferences between the internal components of the existing electronic devices and the electrical power supply device according to the proposed technique.

According to one particular embodiment, the cover comprises a third part defining a reception housing for holding the cables.

Thus, in one particular embodiment, the cables can be stowed inside the cover in a compartment provided for this purpose so that their presence does not hamper the handling of the portable electrical power supply device when connecting the portable electrical power supply device to an electronic apparatus such as a payment terminal. In addition, such a reception housing helps minimize the volume of the portable electrical power supply device.

According to one particular characteristic, the first part of the cover partially covers the battery.

This minimizes the volume of the cover and therefore of the portable electrical power supply device, in one particular embodiment.

Besides, in one particular embodiment, this helps ensure the backward compatibility of such a portable electrical power supply device with the reception housings for batteries of existing electronic apparatuses, and notably existing payment terminals. Indeed, the part of the battery that is not covered can then be inserted without difficulty into the usual reception housings of the existing electronic apparatuses.

According to one particular characteristic, the cables and the female connector are substantially tangential to a surface of the battery.

Such an arrangement, in one particular embodiment, minimizes the volume of the portable electrical power supply battery according to the proposed technique. This also makes it possible to accurately position the cables and the connector relative to the battery so as to be able to place a cover on them that is used to improve the kinematics of connection and disconnection of the portable electrical power supply device.

According to one particular characteristic, the battery is a solid of revolution, and the holes of the female connector extend substantially perpendicularly to the axis of revolution of the battery.

Such an arrangement, in one particular embodiment, improves the kinematics of connection and disconnection of the portable electrical power supply device relative to an existing electronic apparatus such as a payment terminal. Indeed, the reception housings for batteries of existing electronic apparatuses, such as payment terminals, generally consist of an open compartment having a shape complementary to that of the battery. They therefore also have an axis of revolution. In the case of a solid of revolution such as a cylinder, the connection plugs of a male power supply connector of an electronic device are generally oriented so as to be substantially perpendicular to the axis of revolution of the reception housing for batteries. The connection plugs are therefore also oriented perpendicularly to the axis of revolution of the battery when it is inserted into the reception housing for batteries. Such an orientation of the female connector and its orifices therefore makes it possible, once the battery is inserted into its reception housing, to carry out a rotation of the battery around its axis of revolution so as to plug (insert) or unplug (withdraw, disconnect) the female connector into or from the connector of the male power supply.

According to one particular characteristic, the cables each comprise a first part that is connected to the battery and is oriented substantially in parallel to said axis of revolution of the battery and a second part that is connected to the female connector and is oriented so as to be substantially perpendicular to said axis of revolution of said battery.

Such a layout of the cables, in one particular embodiment, minimizes the volume of the portable electrical power supply device according to the proposed technique. This also takes account of the relative positions of the female connector and the battery.

Another aspect relates to the female connector of the portable electrical power supply device which can advantageously be a locking connector.

This secures the connection between the portable electrical power device and the electronic apparatus and ensures the maintenance of the power supply in the event of an impact or a mishandling of the electronic apparatus, in one particular embodiment.

The proposed technique pertains to a method for connecting said portable electrical power supply device as proposed to a male power supply connector of an electronic apparatus such as a payment terminal.

According to the proposed technique such a method implements the following steps:
motion of rotation and/or translation of said battery, so as to simultaneously align said battery with its reception housing and align said female connector with the connection plugs of said male power supply connector of said electronic apparatus;
motion of translation of said battery so as to simultaneously insert said battery into its reception housing and plug said female connector into said male power supply connector of said electronic apparatus.

Such a method makes it possible to notably connect the portable electrical power supply device as proposed to an electronic apparatus such as a payment terminal using only one hand, in one particular embodiment. In addition, the connection kinematics are greatly simplified as compared with the prior art since only two movements are generally sufficient for any user to make a connection, in one particular embodiment.

The proposed technique pertains to a method for disconnecting a portable electrical power supply device as proposed from a male power supply connector of an electronic apparatus such as a payment terminal.

According to the proposed technique, such a method implements the following steps:
motion of rotation of said battery within its reception housing until disconnection (unplugging) of said female connector from said male power supply connector of said electronic apparatus;
motion of translation of said battery so as to extract it from its reception housing.

Such a method makes it possible, in one particular embodiment, to notably connect the portable electrical power supply device as proposed to an electronic apparatus such as a payment terminal using only one hand. In addition, the disconnection kinematics are greatly simplified as compared with the prior art since only two movements are generally sufficient for any user to make a connection.

4. LIST OF FIGURES

Figure 2:
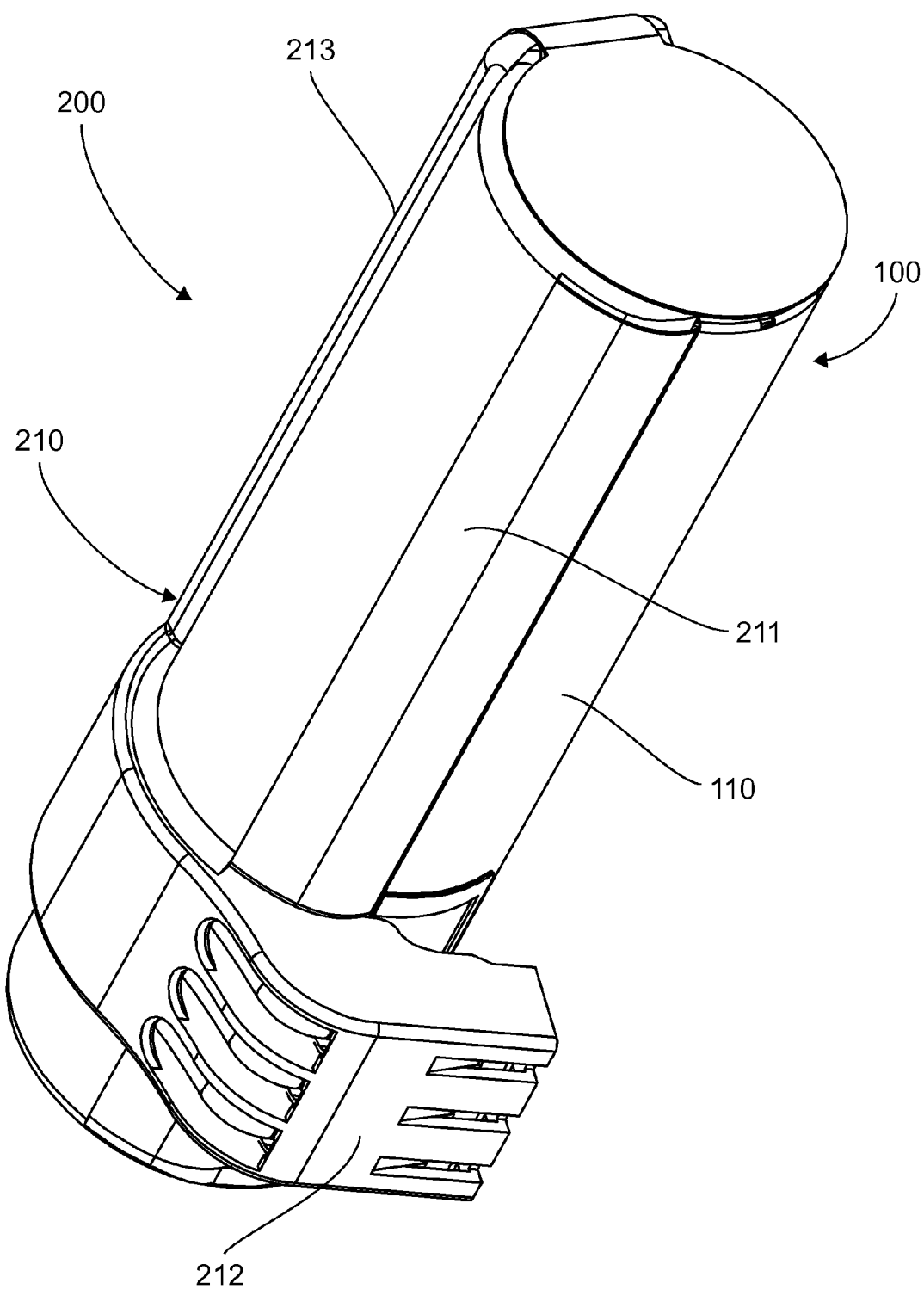
Figure 3:
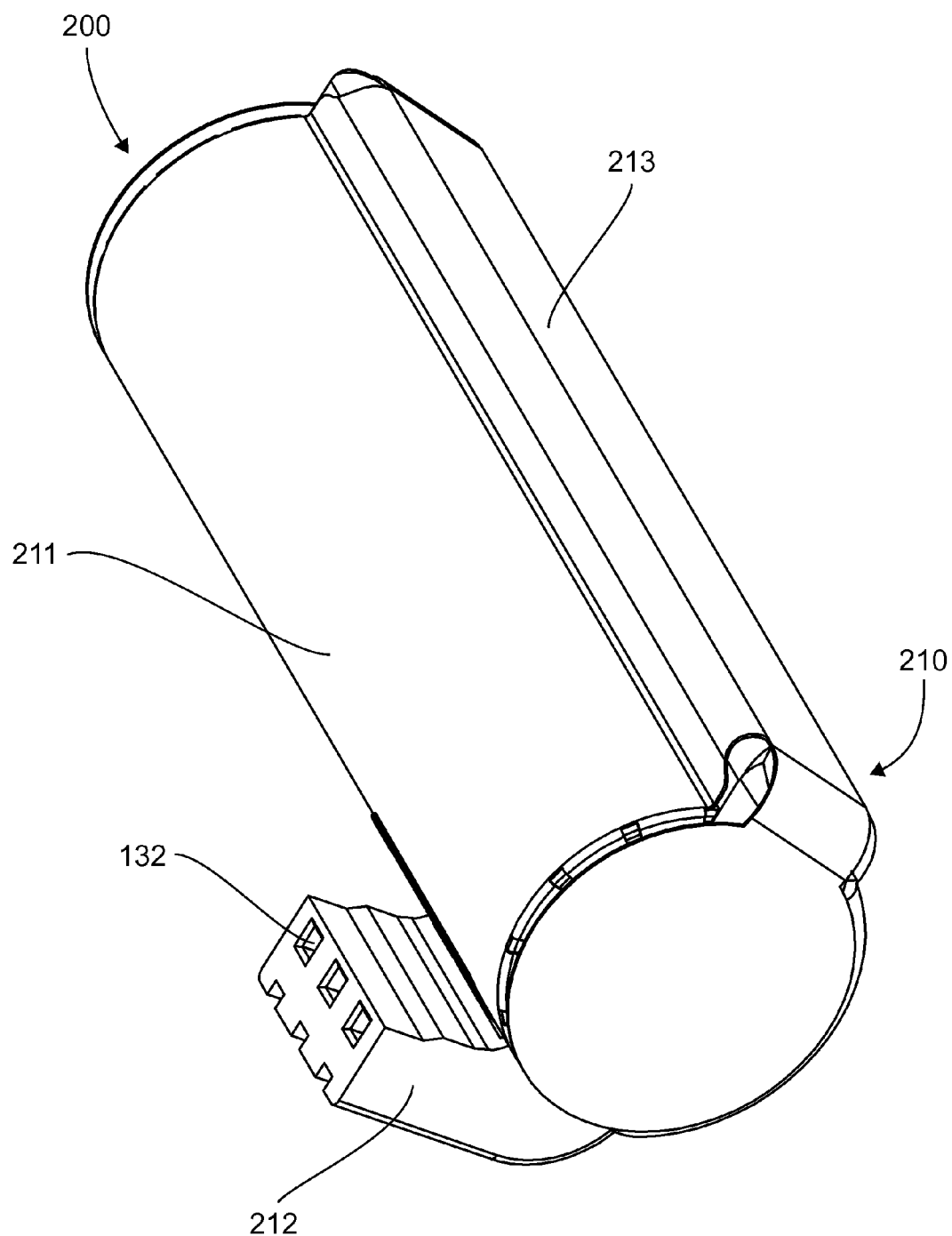
Figure 4:
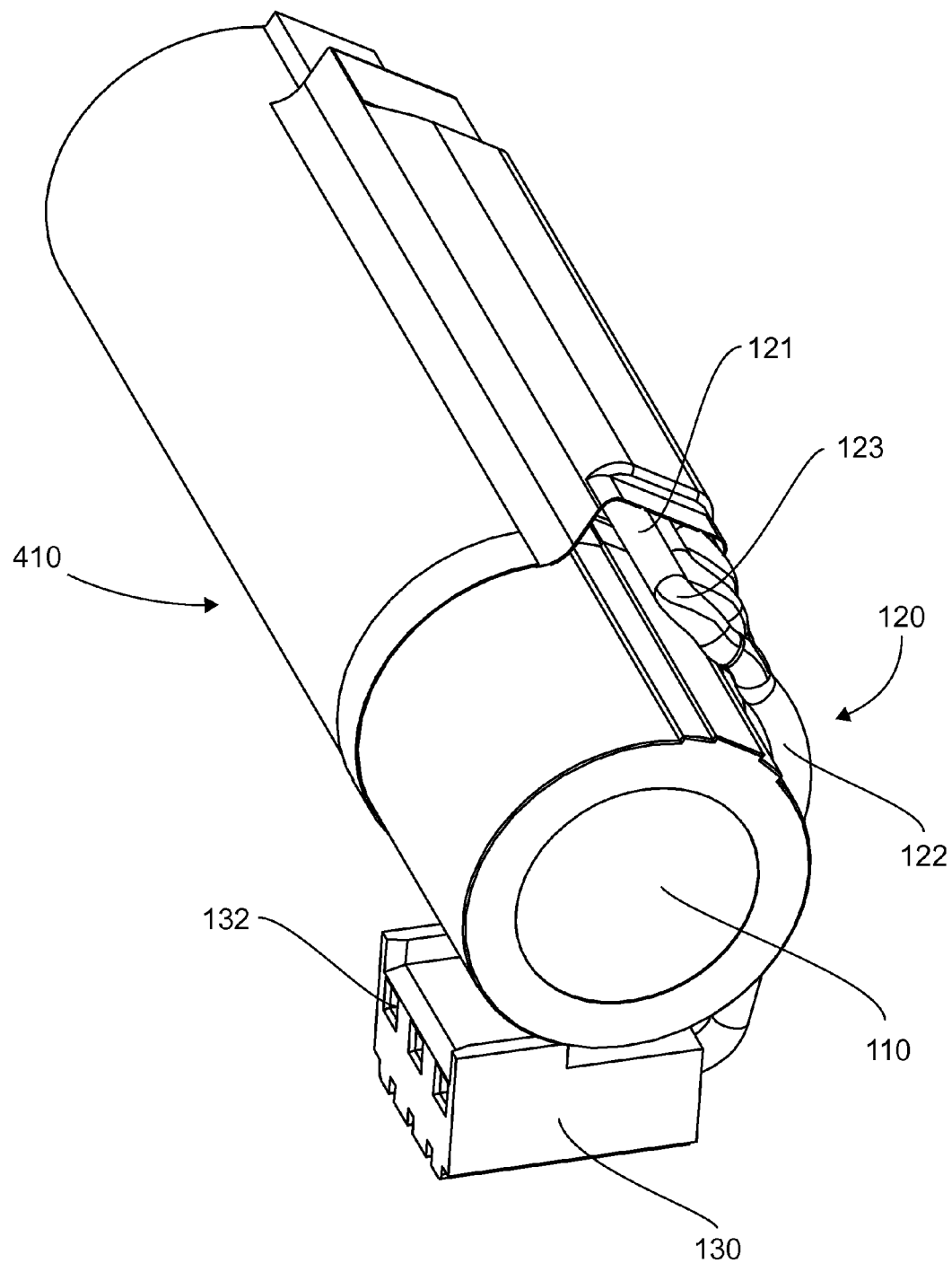
Figure 5:
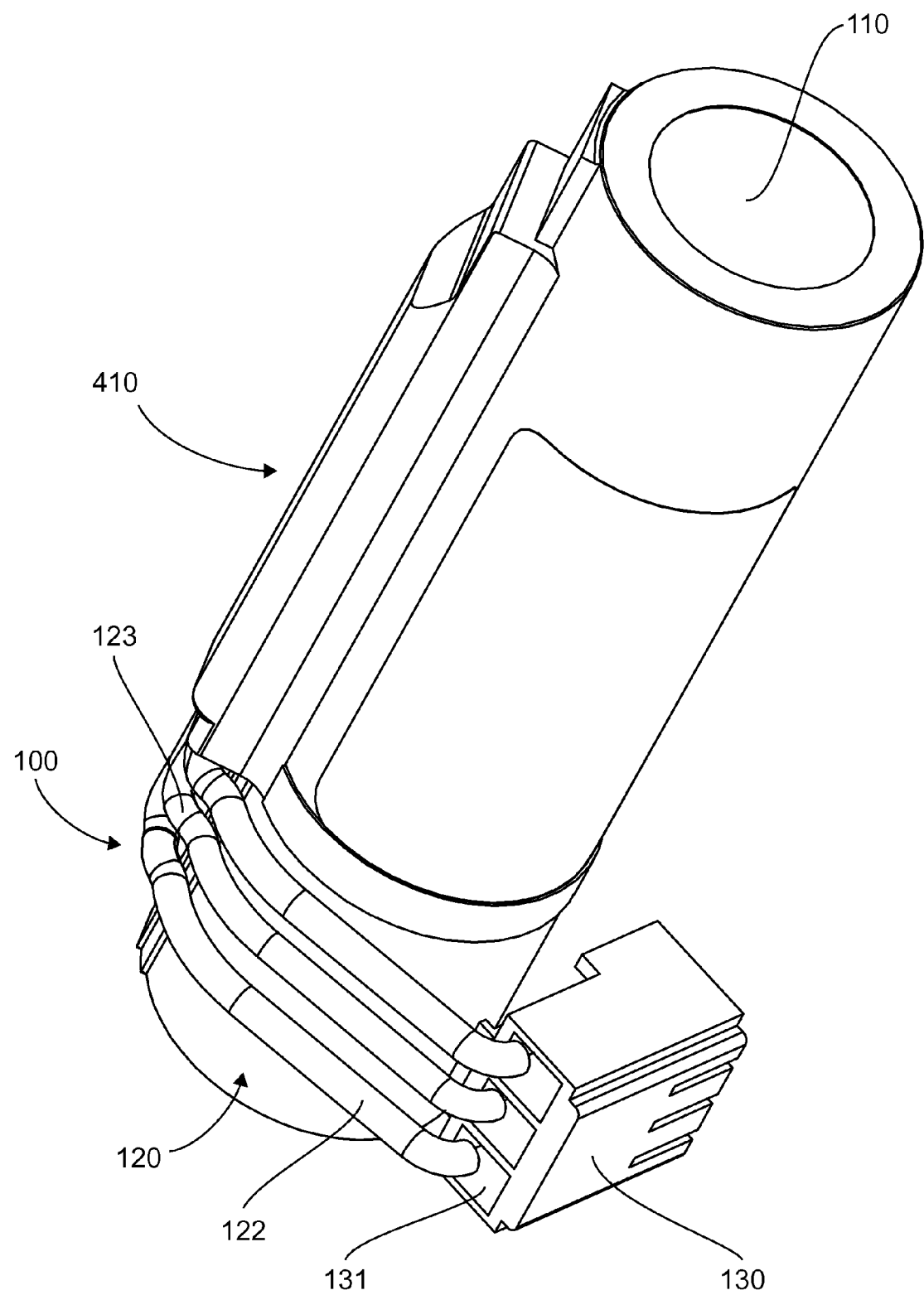
Figure 6:
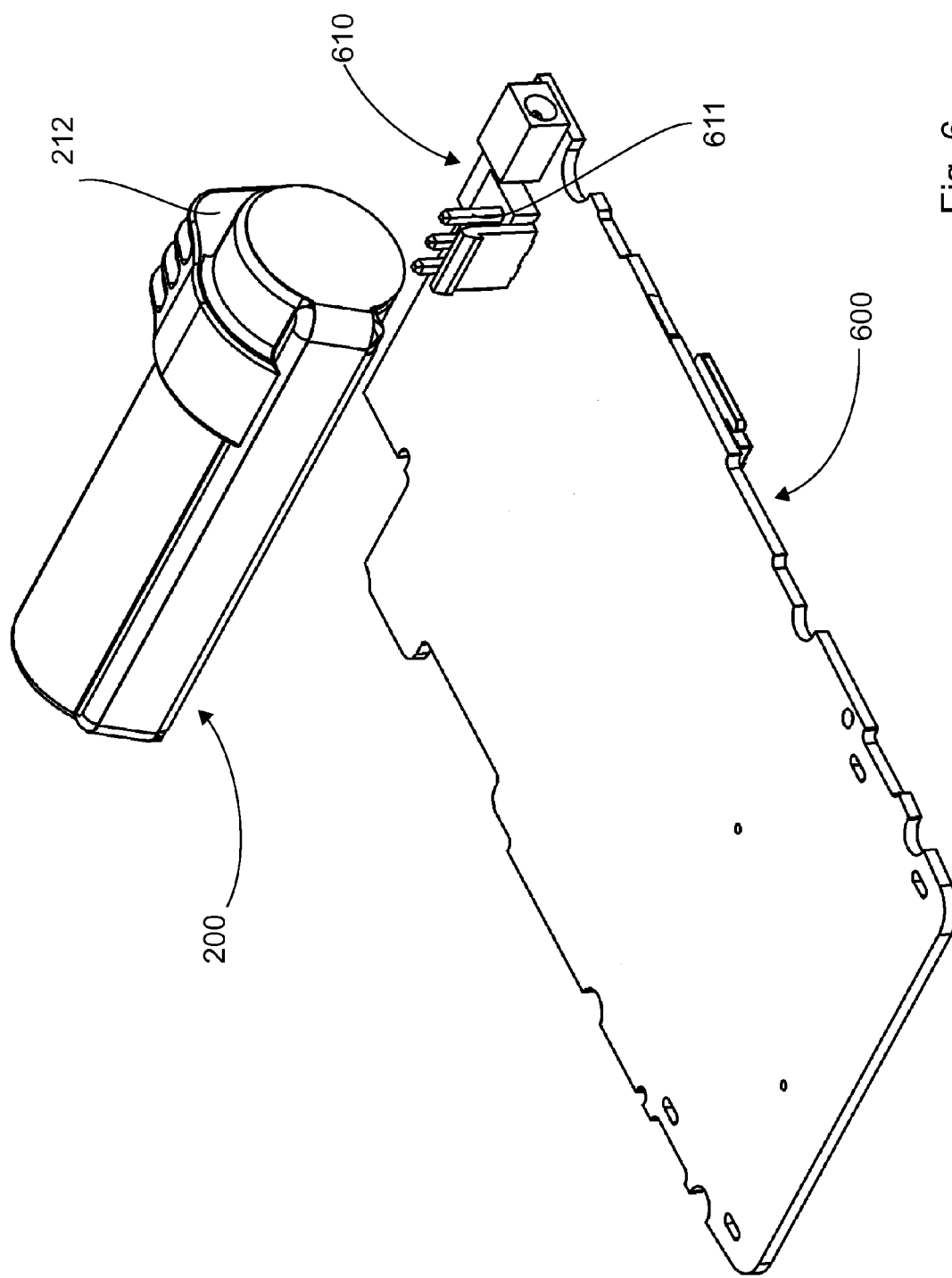

Other goals, characteristics and advantages of the proposed technique shall appear more clearly from the following description, given by way of a simple illustratory and non-limiting example with reference to the appended figures, of which:

FIG. 1 illustrates a portable electrical power supply device according to the prior art;

FIG. 2 presents a first view in perspective of a portable electrical power supply device according to the proposed technique;

FIG. 3 presents a second view in perspective of the electrical power supply device according to the proposed technique;

FIG. 4 presents a transparent view of the portable electrical power supply device according to the proposed technique;

FIG. 5 presents a transparent view of the electrical power supply device of FIG. 4 in another orientation;

FIG. 6 presents a view in perspective of the portable electrical power supply device as proposed before it is inserted into the male power supply connector of an electronic payment terminal;

FIG. 7 presents a view in section of FIG. 6;

FIG. 8 presents a view in section of the portable electrical power supply device as proposed after it has been inserted into the power supply connector of an electrical payment terminal.

5. DETAILED DESCRIPTION OF EMBODIMENTS

An exemplary, general principle of the proposed technique is based on a portable electrical power supply device comprising a battery, cables and a female connector to which is fixed a hood or cover aimed at attaching the connector to the battery. This cover notably enables the attachment of the female connector and the battery as such. This means that a compact, consistent and rigid unit is obtained. It is thus not necessary to provide for separate handling operations to insert the female connector into the male connector and to insert the battery into its housing. Besides, in at least certain embodiments, the rigid cover is shaped in such a way that it does not mobilize a volume greater than that of the battery without cover. This means that, in at least one embodiment, it is possible to use both the usual batteries (without covers and without attachment) and batteries with covers, which are more practical and simpler to implement. More particularly, for the rigid cover, it is possible to choose a material whose rigidity can be ensured with a relatively small thickness of material.

Such a portable electrical power supply device is compact and rigid, and enables a connection with an existing electronic apparatus such as a payment terminal. This can be done using only one hand and with movements that are simplified as compared with the prior-art. Such a portable electrical power supply device is generally used as a power supply source for electronic apparatuses such as payment terminals.

According to the proposed technique, this portable electrical power supply device can be easily connected to and disconnected from the power supply connector of an electronic apparatus and especially a payment terminal by any user whatsoever, regardless of his dexterity and the size of his fingers.

This portable electrical power supply device can be inserted into and withdrawn from an electronic apparatus, and especially a payment terminal, using only one hand and a few simple motions.

This portable electrical power supply device can be inserted in a secured manner to an electronic apparatus, and especially to a payment terminal, without any risk of damage for the user or for the electronic apparatus.

In one specific embodiment of the proposed technique, the rigid cover directly encloses the female connector and the cables for connection to the battery. Thus, in this embodiment, it is not necessary to have several parts to be assembled. Such an embodiment can be useful for example when there is full control over the female connector manufacturing process or again when it is sought to have, within the portable electrical power supply device, a complementary electronic circuit that can be used to track the state of operation of the battery (volume, amperage, number of charges, current loads, etc.) without any need to implement these functions within the receiver terminal. This lowers the cost of the receiver terminal.

Referring to FIGS. 1 to 8, we present an example of an embodiment of such a portable electrical power supply device. To this end, the device referred to is a prior-art portable electrical power supply device presented with reference to FIG. 1. FIGS. 2 to 8 illustrate the different characteristics of the portable electrical power supply device of the proposed technique.

FIG. 1 illustrates a prior-art portable electrical power supply device 100 comprising a battery 110 connected to a female connector 130 by means of cables 120. Holes 131, 132 extend from one side of the connector 130 to the other, along its length, so that cables 120 can be inserted therein at the input and connection plugs of a male power supply connector can be inserted therein at the output. These holes 131, 132 also shelter electrical contacts so as to be able to set up electrical connections at the input and output of the connector 130. These electrical contacts can notably take the form of a spring leaf or a plate.

FIG. 2 presents a first view in perspective of a portable electrical power supply device 200 as proposed, where a cover 210 gets fixed to the prior-art portable electrical power supply device 100. Thus, a first part 211 of the cover is attached to the battery 110, a second part 212 of the cover is fixed to the connector 130 and a third part 213 of the cover houses and maintains the cables 120.

Thus, this FIG. 2 shows that the constituent elements of the prior-art portable electrical power supply device 100 are integrally covered by the cover 210 except for the battery 110 which is only partially covered. Naturally, in one variant, the battery 110 is entirely covered by the first part of the cover 211.

The first and second parts 211 and 212 of the cover 210 have a shape that is respectively complementary to that of the battery 110 and the connector 130. A reception housing 213 for the cables also holds the cables 120. The cover 210 therefore makes it possible to perfectly receive the constituent elements (110, 120, 130) of the prior-art portable electrical power supply device 100. The shape of the cover 210 is therefore such that it does not interfere with the internal components of the existing electrical apparatuses. The portable electrical power supply device 200 such as the one proposed is thus compatible with existing electrical apparatuses. In addition, the volume of the cover 210 and therefore that of the electrical power supply device 200 is thus minimized.

Besides, since the first, second and third parts (211, 212, 213) are part of the same cover 210, the portable electrical power supply device 200 as proposed then forms a single non-deformable unit. In other words, the connector 130 is thus rigidly connected to the battery 110 by means of the cover 210.

Advantageously, the connector 130 can be a locking connector thus securing the connection between the male and female connectors through locking means.

FIG. 3 presents the portable electrical power supply device 200 of FIG. 2 from another angle of view which especially illustrates the output holes 132 of the connector 130. Thus, the holes 132 illustrated in FIG. 3 are positioned at the output of the connector 130 and serve to receive the connection plugs of a male power supply connector. Electrical contacts placed within these holes 132 set up an electrical connection between the connector 130 and the connection plugs of a male power supply connector. Input holes 131 are also situated at the input of the connector 130 in which electrical contacts ensure the connection between the cables 120 and the connector 130.

FIG. 4 presents a cutaway view of the portable electrical power supply device 200 comprising the prior-art portable electrical power supply device 100 and a partial cover 410. Thus, in this FIG. 4, certain portions of the cover 210 have been removed in order to illustrate the layout of the cables 120 and of the connector 130 relative to the battery 110 when the cover 210 is attached to the prior-art electrical power supply device 100.

The connector 130 and the cables 120 are thus substantially tangential to the side surface of the battery 110 which has a substantially cylindrical shape. The cables 120 have a first part 121, the free end of which is connected to the battery 110, and a second part 122, the free end of which is connected to the connector 130. The first part 121 of the cables 120 extend in parallel to the axis of revolution of the battery, i.e. along its length, while the second part 122 of the cables 120 extends perpendicularly to the axis of revolution of the battery, along its circumference. The parts 121 and 122 of the cables 120 meet at an elbowed part 123 and mutually form an angle substantially equal to 90°.

Besides, the input and output holes 131, 132 of the connector 130 extend perpendicularly to the axis of revolution of the battery 110.

Thus, the entry holes 131 of the female connector 130 can receive the free end of the second part 122 of the cables 120. Electrical contacts then enable an electrical connection between the cables 120 and the connector 130.

The output holes 132 of the female connector 130 are oriented so that they can get plugged into the connection plugs of a male power supply connector by means of a rotational motion of the battery 110 after it is inserted into a reception housing for batteries of an electronic apparatus. Indeed, such reception housings for batteries of existing electronic apparatuses such as payment terminals generally allow such a rotation of the battery 110 after it has been inserted into the housing. The arrangement of the connector 130 and of its output holes 132 tangential to the side surface of the battery and perpendicular to its axis of revolution then enable their insertion into or withdrawal from the male power supply connector of an existing electronic apparatus during the rotational motion of the battery 110.

FIG. 5 shows a second cutaway view of the portable electrical power supply device 200 in an orientation different from that of FIG. 4. This FIG. 5 therefore again illustrates the prior-art portable electrical power supply device 100 as well as a partial cover 410. The part 122 of the cables 120 extends perpendicularly to the axis of revolution of the battery 110 between the input holes 131 of the connector 130 and the elbowed part 123 of the cables 120.

FIG. 6 illustrates a view in perspective of the portable electrical power supply device 200 as proposed before its insertion into the three connection plugs 610 of the male power supply connector 610 which is connected to the motherboard 600 of an electronic payment terminal. The second part 212 of the cover 210 is accurately oriented so that it can be plugged into the male power supply connector 610 by a single translation or rotational motion (depending on the implementation).

FIG. 7 presents a sectional view of FIG. 6. Again, the portable electrical power supply device 200 is accurately oriented relative to the male power supply connector 610, so much so that a single motion of translation (or of rotation) permits the power supply device 200 to be connected to the motherboard 600 via the male and female connectors 610, 130. Once an electrical connection has been set up between the electrical power supply device 200 and the motherboard 600, the motherboard 600 is powered with electrical energy and the electronic apparatus can be powered on.

FIG. 8 shows a sectional view of the portable electrical power supply device 200 as proposed after the female connector 130 has been inserted into the male power supply connector 610. The battery 110 is thus inserted into its reception housing 810 which essentially consists of an open compartment having a shape complementary to that of the battery 110. The battery 110 can therefore if necessary be driven rotationally after it has been inserted into the reception housing 810. The leaf spring 820 of the female connector 130 is then in contact with the connection plug 611 of the male power supply connector 610. The portable electrical power supply device 200 can then supply the motherboard 600 with electrical power so as to enable the electrical payment terminal to be powered on.

The portable electrical power supply device 200 as proposed is therefore a compact and rigid portable electrical power supply device serving to improve the kinematics of connection and disconnection with an electronic apparatus such as a payment terminal.

Thus, the connection and disconnection operations for the portable electrical power supply device 200 can be done with only hand according to kinematics that are greatly simplified as compared with the prior art in one particular embodiment. Indeed, according to the proposed technique, only one or two simple motions are needed to carry out these connection and disconnection operations.

To connect the portable electrical power supply device to the electronic apparatus, the user will preferably hold the portable electrical power supply device in one hand at the level of the battery 110 or the first part 211 of the cover 210. With a first rotational and/or translation motion, the user will bring the battery 110 closer to the reception housing 810 while at the same time aligning the female connector 130 with the male power supply connector 610. Then, through a translation motion, the user will house the battery in its reception housing 810 and simultaneously plug the connection plugs 611 of the male power supply connector 610 into the female connector 130.

To disconnect the portable electrical power supply device from the electronic apparatus, the user will preferably hold the portable electrical power supply device with a one hand at the battery 110 or the first part 211 of the cover 210. With a first rotational motion, the user disconnects the female connector 130 from the male power supply connector 610. Then, by means of a translational motion, the user will remove the portable electrical power supply device 200 from its reception housing 810 so as to be able to extract it from the electronic apparatus.

Besides, the portable electrical power supply device 200 as proposed is generally compatible with electronic apparatuses using prior-art portable electrical power supply devices 100 of the same prior-art type. Indeed, the battery 110 is only partially covered by the cover 210 in one of the embodiments of the proposed technique so that it can be easily inserted into the existing reception housings for batteries. In addition, the complementary nature of the parts 211, 212 and 213 of the cover 210 with the elements 110, 120 and 130 of the prior-art electrical power supply devices 100 ensures the backward compatibility of the proposed device 200 with existing electronic apparatuses, in one particular embodiment. Indeed, the shape of the cover 210 is thus adapted so that it does not interfere with the internal elements constituting the electronic apparatuses, and especially payment terminals.

Although the present disclosure has been described with reference to one or more examples, workers skilled in the art will recognize that changes may be made in form and detail without departing from the scope of the disclosure and/or the appended claims.

The invention claimed is:

1. A portable electrical power supply device for electronic apparatus comprising:
    a female connector comprising at least two electrical contacts situated in the connector;
    at least two cables connected to the at least two electrical contacts situated in the female connector;
    a battery connected to the at least two cables, said battery being a solid of revolution; and
    a cover attached to the battery and rigidly binding said female connector to said battery;
    said cables and said female connector being substantially tangential to a surface of said battery, and said female connector comprising holes that extend substantially perpendicularly to an axis of revolution of said battery.

2. The portable electrical power supply device according to claim 1, wherein said cover comprises a first part having a shape that is substantially complementary to a shape of said battery and a second part having a shape that is substantially complementary to a shape of said female connector.

3. The portable electrical power supply device according to claim 2, wherein the cover comprises a third part defining a reception housing for holding the at least two cables.

4. The portable electrical power supply device according to claim 2, wherein said first part of said cover partially covers said battery.

5. The portable electrical power supply device according to claim 1, wherein said at least two cables each comprise a first part that is connected to said battery and is oriented substantially in parallel to said axis of revolution of said battery, and a second part that is connected to said female connector and is oriented so as to be substantially perpendicular to said axis of revolution of said battery.

6. The portable electrical power supply device according to claim 1, wherein said female connector is a locking connector.

7. A method comprising:
connecting a portable electrical power supply device to an electronic apparatus, the portable electrical power supply device comprising a cover attached to a battery and rigidly binding a female connector to said battery that is connected to at least two cables, themselves connected to at least two electrical contacts situated in the female connector, said electronic apparatus comprising a male power supply connector and a reception housing for the battery, wherein connecting comprises:
motion of translation of said battery so as to insert said battery into said reception housing for said battery; and
after the motion of translation, motion of rotation of said battery within said reception housing for said battery until connection of said female connector into said male power supply connector.

8. A method comprising:
disconnecting a portable electrical power supply device from an electronic apparatus, the portable electrical power supply device comprising a cover attached to a battery and rigidly binding a female connector to said battery that is connected to at least two cables, themselves connected to at least two electrical contacts situated in the female connector, and said electronic apparatus comprising a male power supply connector and a reception housing for the battery, wherein disconnecting comprises:
motion of rotation of said battery within said reception housing for said battery until disconnection of said female connector from said male power supply connector; and
after the motion of rotation, motion of translation of said battery so as to extract said battery from said reception housing for said battery.

* * * * *